J. F. ROBBINS.
HARROW.
APPLICATION FILED SEPT. 23, 1911.

1,018,344.

Patented Feb. 20, 1912.

2 SHEETS—SHEET 1.

Witnesses
Alan F. Garner
R. B. Cavanagh

Inventor
John F. Robbins.
By Victor J. Evans
Attorney

J. F. ROBBINS.
HARROW.
APPLICATION FILED SEPT. 23, 1911.
1,018,344.
Patented Feb. 20, 1912.
2 SHEETS—SHEET 2.
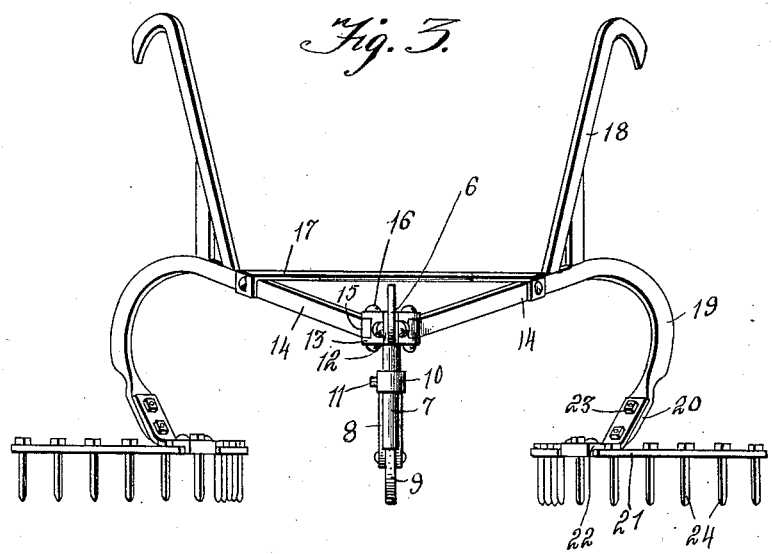
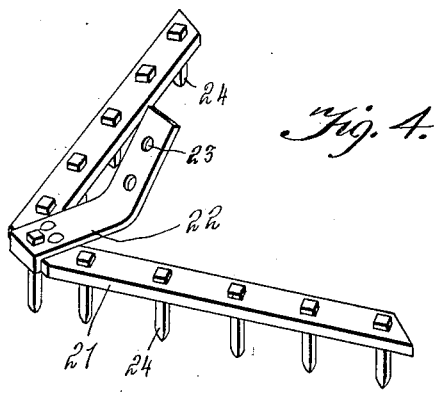
Witnesses
Inventor
John F. Robbins
By Victor J. Evans
Attorney

UNITED STATES PATENT OFFICE.

JOHN F. ROBBINS, OF HAMLIN, TEXAS.

HARROW.

1,018,344.  Specification of Letters Patent.  Patented Feb. 20, 1912.

Application filed September 23, 1911. Serial No. 650,905.

*To all whom it may concern:*

Be it known that I, JOHN F. ROBBINS, a citizen of the United States, residing at Hamlin, in the county of Jones and State of Texas, have invented new and useful Improvements in Harrows, of which the following is a specification.

The invention relates to harrows, and more particularly to the class of adjustable harrows.

The primary object of the invention is the provision of a harrow, wherein the central draft beam is supported by means of a ground wheel, and has hinged thereto the harrow frame supporting beams which may be adjusted so as to spread them apart or bring the same close together.

Another object of the invention is the provision of a harrow in which the harrow frames are movably connected to the drag supporting beams, so that different sizes or styles of frames may be readily and quickly attached thereto for cultivating purposes.

A further object of the invention is the provision of a harrow which is simple in construction, strong, durable, thoroughly reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 1:
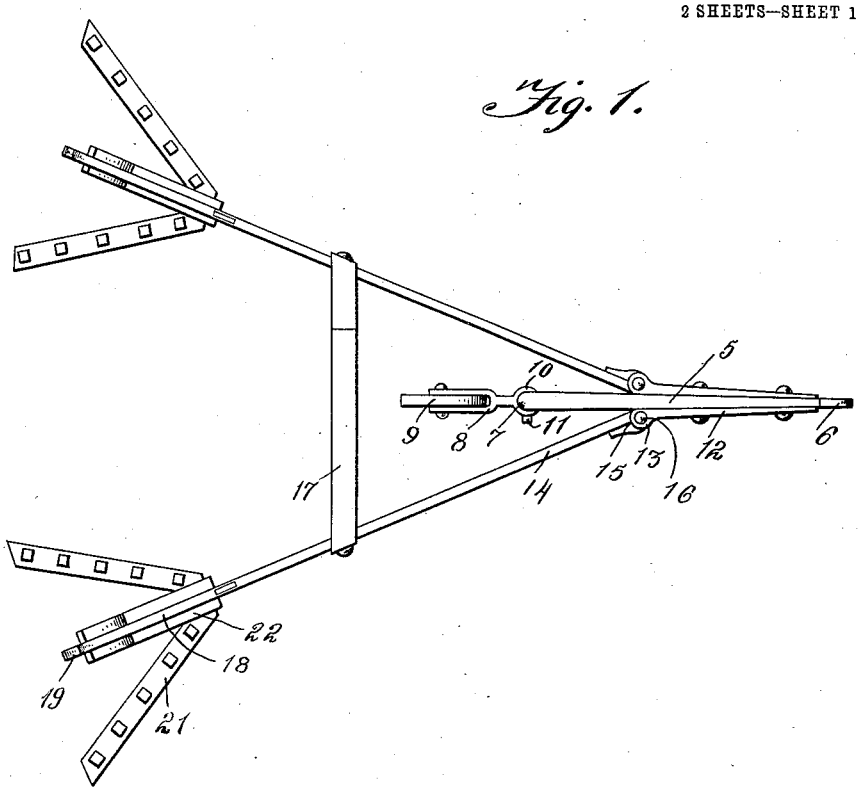
Figure 2:
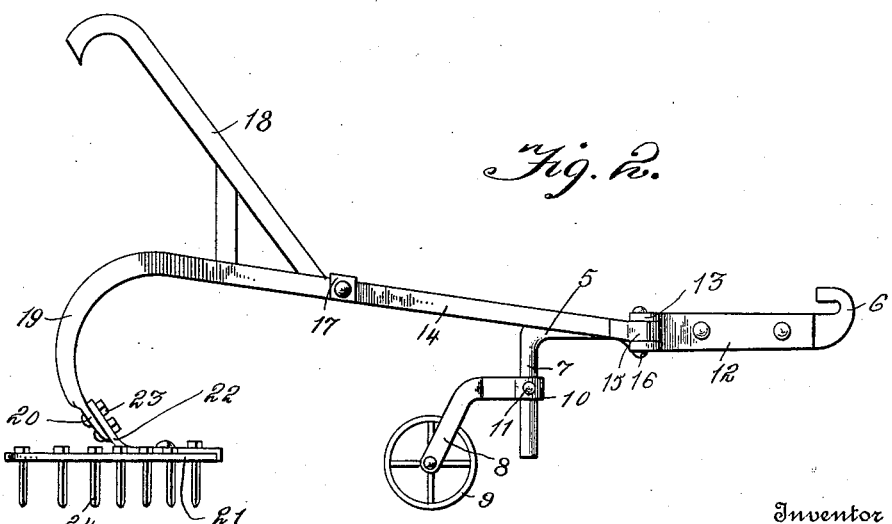

In the drawings: Figure 1 is a top plan view of a harrow constructed in accordance with the invention. Fig. 2 is a side elevation thereof. Fig. 3 is a front elevation. Fig. 4 is a perspective view of one of the harrow frames removed from the drag beam.

Similar reference characters indicate corresponding parts throughout the several views of the drawings.

Referring to the drawings by numerals, the harrow comprises a central draft beam 5, the same being formed with an upwardly and rearwardly curved forward hook terminal 6, to which is adapted to be connected the draft rigging, as usual, the opposite end of the said beam being downwardly extended to form a depending stem 7, to which is adjustably connected a forked bracket 8, in the fork of which is journaled a ground wheel 9, the said bracket being formed with a collar 10, slidably fitted upon the stem 7 and carrying a set screw 11, whereby the bracket may be raised or lowered and locked in adjusted position.

Fixed to the opposite sides of the central draft beam 5, between the forward hook terminal 6 and the stem 7, are plates 12, the same being formed with split ears 13 at their rear ends, to which are hinged harrow frame supporting or drag beams 14, the forward ends of which are formed with eyes 15 inserted in the split ears 13, and through which are passed pivot pins 16, the same being also passed through the said ears 13, thereby hinging said drag or supporting beams 14 to the central draft beam. It will be seen that these drag or supporting beams 14 may be laterally adjusted by means of a two-part straddle bar 17, the ends of which are downturned to lie against the outer side faces of the beams 14 and are bolted thereto in the usual manner.

The supporting or drag beams 14 have fixed thereto in any ordinary well-known manner guide handle bars 18 which are of the usual type in use with plows or cultivators.

The drag or supporting beams 14 are provided with rear downwardly and forwardly curved legs 19, the ends of which are flattened, as at 20, to which are connected the V-shaped harrow teeth frames 21, the same having fixed thereto medial substantially L-shaped clips 22, which are bolted, as at 23, to the flattened ends 20 of the legs 19, as is clearly shown.

Engaged in the frames 21, at spaced intervals, are vertical harrow teeth 24, which are adapted to cut into the ground for the breaking of the soil, as the harrow is advanced through a field, thus bringing the ground to a perfect state of cultivation.

What is claimed is:

1. A harrow, comprising a central draft beam having a downwardly extended rear stem, a forked bracket adjustably connected with the stem and extending rearwardly therefrom, a ground wheel journaled in the fork of the bracket, drag beams hinged to opposite sides of the central draft beam, harrow teeth frames detachably connected with the rear ends of the said drag beams, and an adjustable bar connected with the beams for holding the same in spread or close relation to each other.

2. A harrow, comprising a central draft beam having a downwardly extended rear stem, a forked bracket adjustably connected with the stem and extending rearwardly therefrom, a ground wheel journaled in the fork of the bracket, drag beams hinged to opposite sides of the central draft beam, harrow teeth frames detachably connected with the rear ends of the said drag beams, an adjustable bar connected with the beams for holding the same in spread or close relation to each other, and a hook extension formed on the forward end of the central draft beam.

In testimony whereof I affix my signature in presence of two witnesses.

JOHN F. ROBBINS.

Witnesses:
W. W. JOHNSON,
J. J. ROBBINS.

Copies of this patent may be obtained for five cents each, by addressing the "Commissioner of Patents, Washington, D. C."